US012652690B2

(12) United States Patent
Mudulodu et al.

(10) Patent No.: US 12,652,690 B2
(45) Date of Patent: Jun. 9, 2026

(54) SYSTEM, METHOD AND APPARATUS TO REDUCE ERROR IN UNUSED TONES IN PARTIAL BANDWIDTH WIRELESS TRANSMISSION SYSTEM

(71) Applicant: Silicon Laboratories Inc., Austin, TX (US)

(72) Inventors: Sriram Mudulodu, Hyderabad (IN); Manoj Kumar Medam, Kadapa (IN); Rambabu Katla, Hyderabad (IN); Anil Kumar Adavally, Hyderabad (IN); Aravinth Kumar Ayyappannair Radhadevi, Tamil Nadu (IN)

(73) Assignee: Silicon Laboratories Inc., Austin, TX (US)

( * ) Notice: Subject to any disclaimer, the term of this patent is extended or adjusted under 35 U.S.C. 154(b) by 68 days.

(21) Appl. No.: 17/547,396

(22) Filed: Dec. 10, 2021

(65) Prior Publication Data

US 2023/0189316 A1      Jun. 15, 2023

(51) Int. Cl.
| | |
|---|---|
| *H04W 72/542* | (2023.01) |
| *H04L 27/00* | (2006.01) |
| *H04W 24/04* | (2009.01) |
| *H04W 28/20* | (2009.01) |
| *H04W 84/12* | (2009.01) |

(52) U.S. Cl.
CPC ....... *H04W 72/542* (2023.01); *H04L 27/0014* (2013.01); *H04W 24/04* (2013.01); *H04W 28/20* (2013.01); *H04W 84/12* (2013.01); *H04L 2027/0018* (2013.01)

(58) Field of Classification Search
CPC ... H04W 72/542; H04W 24/04; H04W 28/20; H04W 84/12; H04L 2027/0018; H04L 27/0014
See application file for complete search history.

(56) References Cited

U.S. PATENT DOCUMENTS

| | | | |
|---|---|---|---|
| 8,437,415 B2 | 5/2013 | Mudulodu et al. | |
| 9,722,646 B1 | 8/2017 | Matthews et al. | |
| | (Continued) | | |

FOREIGN PATENT DOCUMENTS

| | | |
|---|---|---|
| CN | 101455008 A | 10/2012 |
| CN | 103259750 A | 8/2013 |
| CN | 105850088 A | 8/2016 |

OTHER PUBLICATIONS

Shreyas Trivedi, "Wi-Fi 6 OFDMA: Resource Unit (RU) Allocations and Mappings", https://blogs.cisco.com/networking/wi-fi-6-ofdma-resource-unit-ru-allocations-and-mappings, May 15, 2021, 4 pgs.

(Continued)

*Primary Examiner* — Nishant Divecha
*Assistant Examiner* — Alan L Lindenbaum

(57) ABSTRACT

In one embodiment, an apparatus includes: a compensation circuit to select one of a plurality of compensation sets based on an allocated resource unit (RU) and compensate a digital complex signal using the selected compensation set; a digital-to-analog converter to convert the compensated digital complex signal to a compensated analog complex signal; a mixer coupled to the digital-to-analog converter to upconvert the compensated analog complex signal to a radio frequency (RF) signal; and a power amplifier coupled to the mixer to amplify the RF signal.

7 Claims, 7 Drawing Sheets

(56)     References Cited

U.S. PATENT DOCUMENTS

| | | | |
|---|---|---|---|
| 9,787,336 B1 * | 10/2017 | Cova | H04B 1/0475 |
| 10,827,451 B2 | 11/2020 | Mudulodu | |
| 2003/0139147 A1 | 7/2003 | Shi | |
| 2007/0058623 A1 * | 3/2007 | Moorti | H04W 28/18 |
| | | | 370/389 |
| 2015/0365203 A1 | 12/2015 | Suh et al. | |
| 2016/0365971 A1 * | 12/2016 | Liu | H04L 27/3863 |
| 2018/0097593 A1 | 4/2018 | Da Silva et al. | |
| 2021/0075557 A1 | 3/2021 | Mudulodu et al. | |
| 2022/0353110 A1 * | 11/2022 | Changlani | H04L 25/0224 |

OTHER PUBLICATIONS

U.S. Appl. No. 17/472,935, filed Sep. 13, 2021, entitled "System, Apparatus and Method for Acquisition of Signals in Wireless Systems with Adverse Oscillator Variations," by Sriram Mudulodu and Manoj Kumar Medam, 30 pgs.

Translation of Office action, including Chinese Search Report received in related Application No. CN 2022113430657 mailed Mar. 26, 2025, 10 pages.

R1-2109956 On time and frequency synchronization enhancements for IoT NTN—Ericsson, "3GPP TSG-RAN WG1 Meeting #106-bis-e R1-2109956," e-Meeting, Oct. 11-Oct. 19, 2021, pp. 1-10.

Foreign Search Report in related Chinese Application No. 202211343065.7, dated Oct. 29, 2025, 2 pages.

* cited by examiner

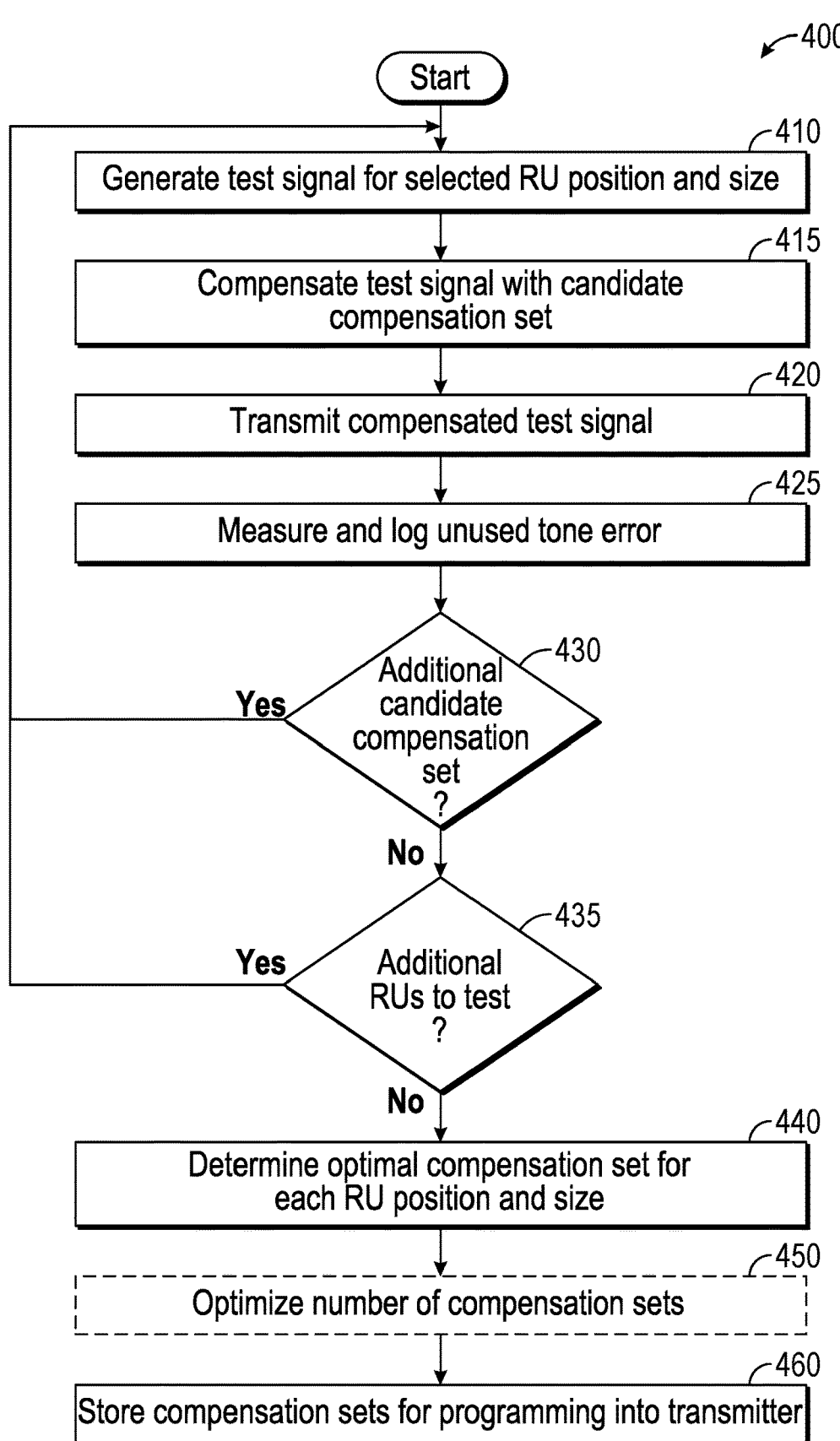

—400

Start

410
Generate test signal for selected RU position and size

415
Compensate test signal with candidate compensation set

420
Transmit compensated test signal

425
Measure and log unused tone error

430
Additional candidate compensation set ?

Yes

No

435
Additional RUs to test ?

Yes

No

440
Determine optimal compensation set for each RU position and size

450
Optimize number of compensation sets

460
Store compensation sets for programming into transmitter

FIG. 4

SYSTEM, METHOD AND APPARATUS TO REDUCE ERROR IN UNUSED TONES IN PARTIAL BANDWIDTH WIRELESS TRANSMISSION SYSTEM

BACKGROUND

As more and more devices including Internet of Things (IoT) devices communicate wirelessly in home and other wireless local area networks (WLANs), the amount of participants and their bandwidth continue to rise.

One solution for allowing multiple devices to communicate with an access point is orthogonal frequency division multiple access (OFDMA), e.g., according to a WIFI-6 protocol. With this technique, the access point may allocate partial bandwidths to different devices, with the amount of bandwidth allocated to each device referred to as a resource unit (RU). Each resource unit has a given position within a total bandwidth allocation and is afforded a number of sub-carriers of the total amount of available sub-carriers, also referred to as tones. Accordingly, an RU allocation is for a given position and number of tones. One concern in such systems is so-called unused tone error in which, e.g., due to IQ mismatches within transmitter circuitry, a transmitter transmits unwanted interference within its unused tones, which may interfere with other devices' allocated RUs.

SUMMARY OF THE INVENTION

In one aspect, an apparatus includes: a compensation circuit to select one of a plurality of compensation sets based on a resource unit (RU) allocated to the apparatus and compensate a digital complex signal using the selected compensation set; a digital-to-analog converter to convert the compensated digital complex signal to a compensated analog complex signal; a mixer coupled to the digital-to-analog converter to upconvert the compensated analog complex signal to a radio frequency (RF) signal; and a power amplifier coupled to the mixer to amplify the RF signal.

In an example, the apparatus further comprises a storage to store the plurality of compensation sets. The storage may include a non-volatile memory written during manufacture of the apparatus. The apparatus may be an integrated circuit having the compensation circuit and the non-volatile memory. The non-volatile memory may store the plurality of compensation sets comprising: a default compensation set; a first group of compensation sets for a first plurality of RUs, each of the first plurality of RUs having N tones; and a second group of compensation sets for a second plurality of RUs, each of the second plurality of RUs having M tones.

In an example, the compensation circuit may further include a selection circuit to select the one of the plurality of compensation sets based on the RU allocated to the apparatus. The selection circuit may select a common compensation set of the first group of compensation sets for a first RU and at least one adjacent RU. The selection circuit may select the default compensation set for a first portion of an uplink packet communication and select one of the first group of compensation sets for a second portion of the uplink packet communication. The selection circuit may select the default compensation set for the first portion of the uplink packet communication when the selection circuit has not received RU allocation information. The compensation circuit may include a selection circuit to select the one of the plurality of compensation sets based at least in part on at least one of a position and a size of the RU. The compensation circuit may include a complex multiplier to multiply the digital complex signal with the selected compensation set, the selected compensation set comprising a complex value. The RU may be a first partial bandwidth having a plurality of tones, the first partial bandwidth of a partial bandwidth network, where the compensation circuit is to reduce unused tone error in one or more other partial bandwidths of the partial bandwidth network.

In another aspect, a method includes: iteratively, for each of a plurality of RUs of a partial bandwidth network: generating, in a device under test having an integrated circuit comprising a transmitter, a test signal for one of the plurality of RUs of the partial bandwidth network; iteratively, for each of a plurality of candidate compensation sets: compensating, in the device under test, the test signal with a candidate compensation set; transmitting, from the device under test, the compensated test signal; and measuring and logging unused tone error information associated with the compensated test signal for other RUs of the partial bandwidth network; determining, based at least in part on the unused tone error information, an optimal compensation set for the RU; and storing the optimal compensation set for at least some of the plurality of RUs into a storage.

In an example, the method further comprises programming the integrated circuit with the stored optimal compensation set for the at least some of the plurality of RUs. Programming the integrated circuit comprises storing a plurality of entries into a non-volatile memory of the integrated circuit, each entry including a compensation set and an identification of one or more RUs to use the compensation set. The method may further include determining one optimal compensation set for two or more of the plurality of RUs. The method may further include determining the one optimal compensation set when a first optimal compensation set for a first RU is within at least a threshold distance of a second optimal compensation set for a second RU.

In yet another aspect, a system includes a transmitter. The transmitter may include: a digital baseband processor to receive information to be transmitted and to process the information into a packet having a preamble and a payload, the packet formed of complex signals; a storage to store a plurality of compensation sets, each of the plurality of compensation sets associated with at least one RU of a partial bandwidth wireless system; a selection circuit coupled to the storage, wherein based at least in part on a RU allocated to the transmitter, the selection circuit is to select a compensation set of the plurality of compensation sets; and a compensation circuit coupled to the selection circuit, where the calculation circuit is to compensate the complex signals for IQ mismatch of the transmitter according to the selected compensation set.

In an example, the compensation circuit comprises a complex multiplier to multiply the complex signals with the selected compensation set, the selected compensation set comprising a complex value.

In an example: in a first mode, the selection circuit is to statically select the compensation set for compensation of the complex signals of the packet; and in a second mode, the selection circuit is to dynamically select a first compensation set and a second compensation set for compensation of the complex signals of the packet. The selection circuit may select a common compensation set of the plurality of compensation sets when the transmitter is allocated a first RU or at least one adjacent RU.

BRIEF DESCRIPTION OF THE DRAWINGS

FIG. 4 is a flow diagram of a calibration technique in accordance with an embodiment.

DETAILED DESCRIPTION

In various embodiments, a transmitter that operates in a partial bandwidth wireless network may be configured to dynamically select one compensation set of a plurality of compensation sets for performing IQ imbalance compensation during transmit operations. In this way, the transmitter may transmit within its allocated RU with reduced interference in other RUs (and particularly within an RU including an image frequency to the allocated RU).

Figure 1:
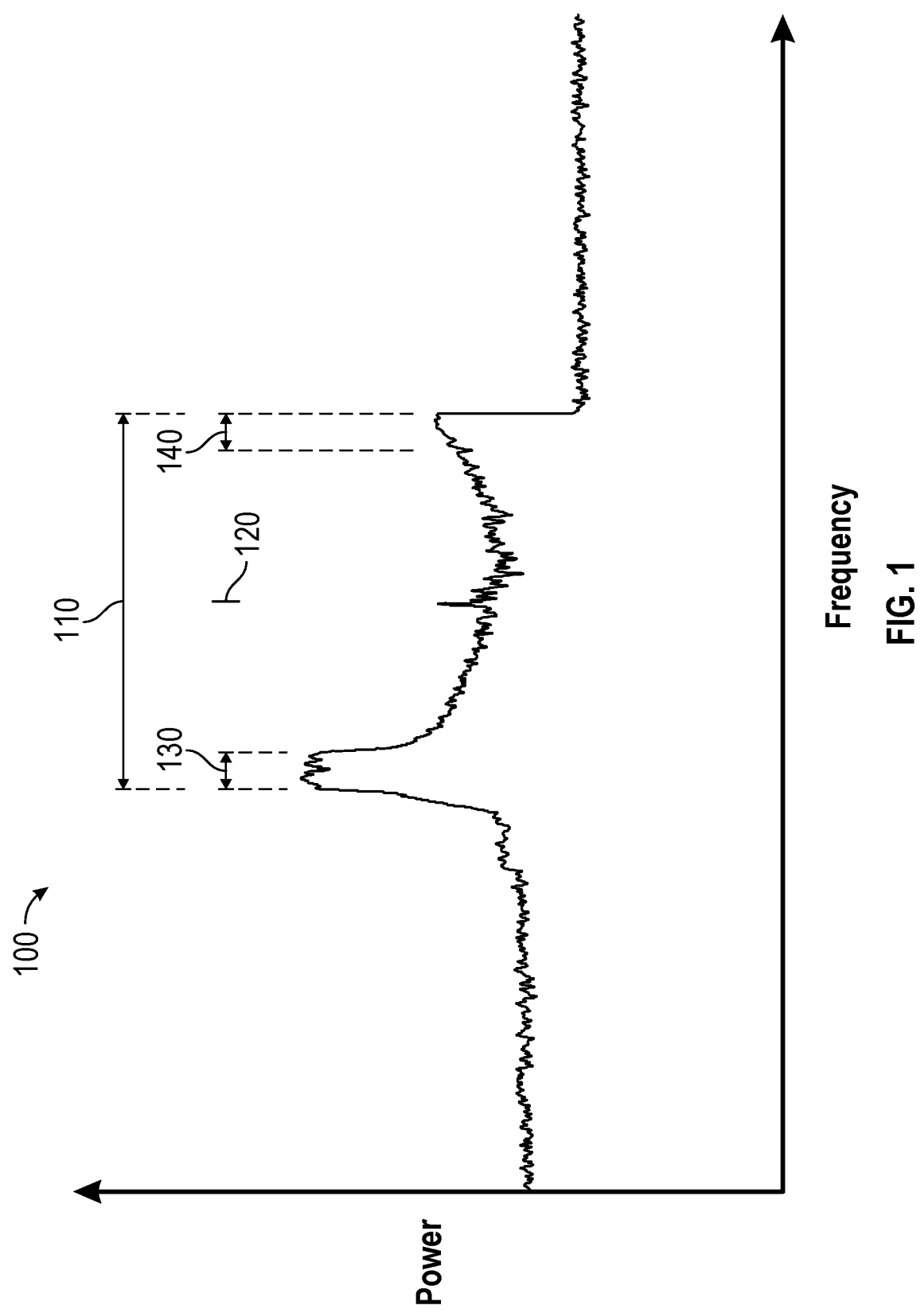
FIG. 1 is a graphical illustration of a transmission of a trigger-based physical protocol data unit.

To illustrate unused tone error, reference is made to FIG. 1, which is a graphical illustration of a transmission of a trigger-based physical protocol data unit (TB PPDU), in which a transmitter is allocated one RU of multiple such RUs in a partial bandwidth system.

Specifically, a total bandwidth 110 of a wireless network 100 is shown in FIG. 1. In an embodiment, total bandwidth 110 may be 20 megahertz (MHz). A center or DC frequency 120 is present at a mid-portion of total bandwidth 110. As further shown, a transmission spectrum of a first RU 130 is illustrated. Assume a first transmitter transmits in this first RU position. As one example, this first RU position may be for a 26-tone RU. While the transmitter transmits this first RU 130 at relatively high power, due to mismatches or other non-linearities within the transmitter, a somewhat high unused tone error is present at an image frequency 140, even where a single default compensation value is used. Depending upon the power level of these image frequency components, an undesirably high level of interference may occur for another transmitter that is transmitting in an RU position at image frequency 140.

IQ imbalance is one of the impairments observed in radio frequency (RF) systems and arises due to the gain/phase mismatch between in-phase and quadrature paths. IQ imbalance causes spurious emissions in the image frequency locations (frequency dependent). Conventionally, IQ imbalance can be measured during a calibration process and a compensation technique is used to avoid its effects. In a full bandwidth WLAN system, a single tone is transmitted at a few MHz away from a carrier and a range of compensation values are swept and spurious emission is measured for each compensation value. The compensation value set that shows the lowest spurious emission is selected for use.

As discussed, in a partial bandwidth system (e.g., as used in WIFI-6 or Long Term Evolution (LTE) systems), each station transmits in the RU allocated to it by an access point. In the presence of IQ imbalance, the transmission in a RU causes spurious emissions in the image frequencies corresponding to the RU (unused tones). This spurious emission in unused tones acts as interference to other stations and is required to be within the limits specified in a given standard, such as the IEEE 802.11ax (WIFI-6) standard. The unused tone error metric is computed based on the power of the unused sub-carriers over a range and the power of sub-carriers in the occupied RU. The unused tone error requirement is defined over 26-tone regions on both sides of the RU spanning the entire supported bandwidth. The requirement is relaxed for the 26-tone group adjacent to the occupied RU as compared to a 26-tone group farther away from adjacent RU.

As discussed above as to FIG. 1, a single default compensation set determined assuming a full bandwidth case may not be suitable for partial bandwidth transmission, since spurious emissions can cause the violation of unused tone error requirements. Embodiments providing multiple compensation sets may be used to realize low spurious emission for all partial bandwidth transmissions (RU position and size). Accordingly with embodiments, unused tone error, particularly at an image frequency, may be reduced by providing compensation. As will be described, this compensation may be performed using a particular compensation set that is more optimal for this partial transmission than a single default compensation value that may be used in a full bandwidth transmission implementation.

Figure 2:
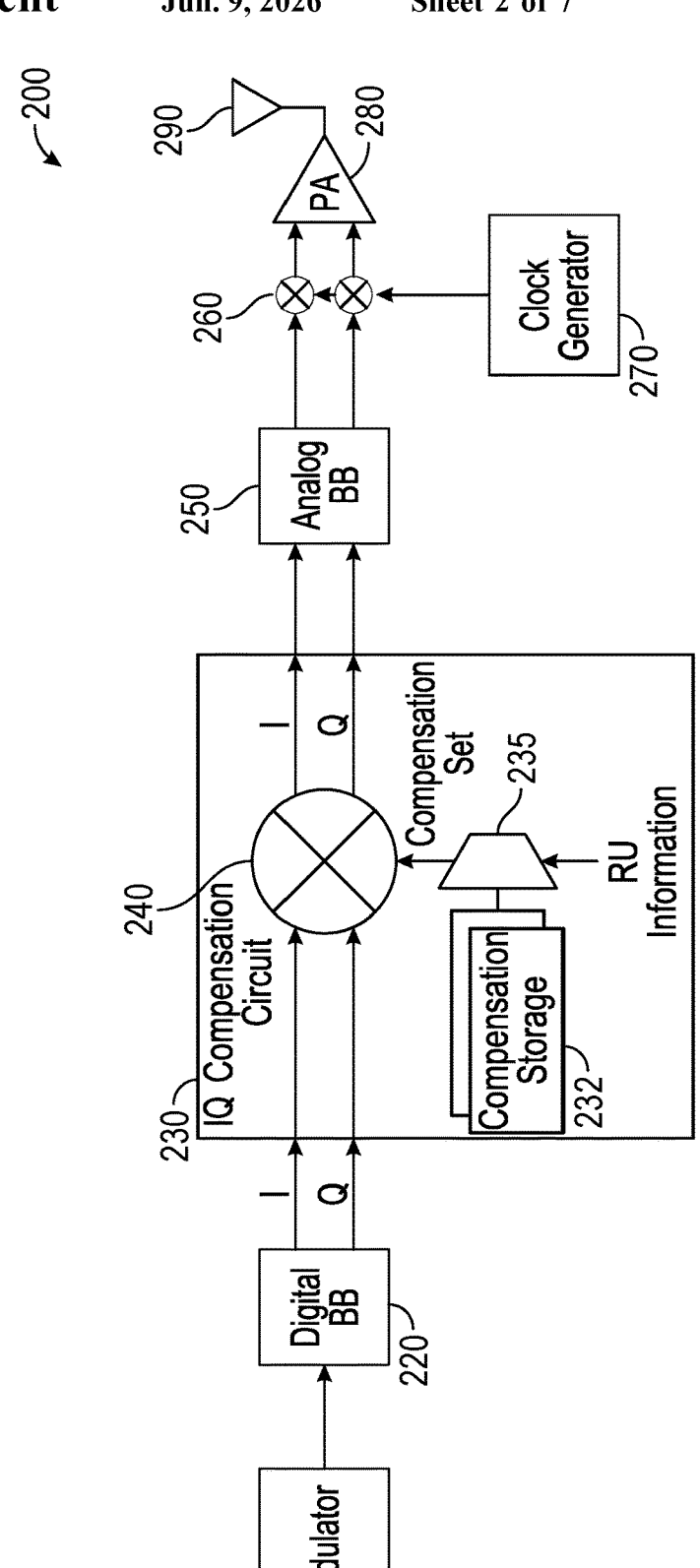
FIG. 2 is a block diagram of a transmitter in accordance with an embodiment.

Referring now to FIG. 2, shown is a block diagram of a transmitter in accordance with an embodiment. As shown in the high level of FIG. 2, transmitter 200 includes various circuitry to process message information, package it for transmission and transmit it. In the high level shown, message information to be transmitted is provided to a modulator 210. Although embodiments are not limited in this regard, in use cases herein modulator 210 may be configured to implement a modulation scheme suitable for OFDMA. For example, the modulation may be according to an orthogonal frequency division multiplexing (OFDM) with binary phase shift keying (BPSK) symbols. Other digital modulation schemes may include quadrature phase shift keying (QPSK), 16-quadrature amplitude modulation (QAM), 64-QAM, or 256-QAM. The modulation process may include channel coding, interleaving, cyclic redundancy checksum (CRC) padding, constellation mapping, inverse fast Fourier transform (IFFT)/fast Fourier transform (FFT) operations, and so forth.

The modulated information is then communicated to a digital baseband processor 220, which may perform various baseband processing including upscaling, scaling, clipping, filtering and so forth. In addition, digital baseband processor 220 may generate complex signals from the incoming modulated information, namely IQ signals that are provided to an IQ compensation circuit 230. While shown in the high level view of FIG. 2 as a separate circuit, understand that in some implementations compensation circuit 230 may be included in baseband processor 220. In some implementations, digital baseband processor 220 may be a standalone processor or may be implemented within a digital signal processor (DSP). Understand that in some embodiments, some or all of compensation circuit 230 may implemented as hardware circuitry configured to execute instructions stored in a non-volatile storage or other non-transitory storage medium to select an appropriate compensation value and perform the compensation described herein.

As shown, IQ compensation circuit 230 includes a compensation storage 232 that may store a plurality of compensation sets. Depending upon implementation, different numbers of compensation sets may be stored, including a default compensation set and other groups or subsets of compensation sets that may be used for different RU position and size combinations. Compensation storage 232 may be implemented as a memory, registers or so forth. In certain use cases, storage 232 may be implemented as a non-volatile memory that is written during manufacture with the multiple compensation sets. These multiple compensation sets may be determined during a calibration process as described further herein. In other cases, the compensation sets may be included in firmware stored in a non-volatile memory, either present within transmitter 200 or coupled thereto, such that upon initialization, these values are stored into compensation storage 232.

In one particular embodiment, compensation storage 232 may store 15 IQ imbalance compensation sets, from which one may be selected based on the RU being used for transmission. In this embodiment, one compensation set is a default set (e.g., for a 242-tone RU or full bandwidth case) or an RU occupying all tones. This default set also may be used when RU allocation information is not available. Compensation storage 232 also may store 8 sets corresponding to 8 26-tone RUs (where a middle RU may use the default set). Compensation storage 232 also may store 4 sets corresponding to 4 52-tone RUs, and 2 sets corresponding to 2 106-tone RUs.

Still with reference to compensation circuit 230, a selection circuit 235 couples to compensation storage 232. In an embodiment, selection circuit 235 may be implemented as a multiplexer. A given compensation set within compensation storage 232 may be selected for a given transmission based on RU information. Note that this RU information may come from higher layers, such as a MAC or other upper layer of transmitter 200, in response to an RU allocation message received from an access point. This RU information may, in an embodiment, take the form of RU position and size information.

Selection circuit 235 may select a given compensation set based at least in part on this RU information. As shown, the selected compensation set is provided to a complex multiplier 240, which may perform a complex multiplication between the compensation set and the incoming IQ signals. Understand that this complex multiplication may thus compensate the IQ signals to accommodate for IQ mismatch and/or other non-linearities of transmitter 200. The resulting compensated IQ signals are provided to an analog baseband processor 250, which may perform further baseband processing such as conversion of the digital IQ signals into analog IQ signals (e.g., via an included digital-to-analog converter), low pass filtering, and so forth.

Resulting signals are then provided to a complex mixer 260, which may upconvert the signals to a radio frequency (RF) level according to a mixing signal received from a clock generator 270. These RF signals then may be amplified in a power amplifier 280 and transmitted via an antenna 290. Understand that in the embodiment of FIG. 2, all circuitry other than antenna 290 may be implemented on a single integrated circuit such as a given IoT IC. While shown at this high level in the embodiment of FIG. 2, understand that many variations and alternatives are possible.

Figure 3:
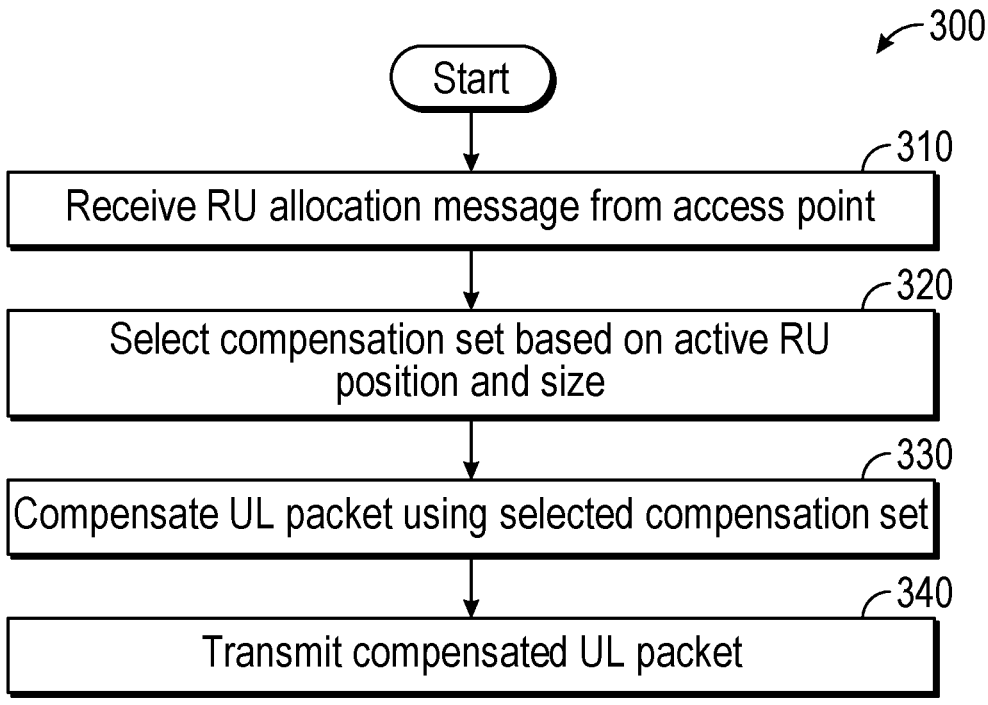
FIG. 3 is a flow diagram of a method in accordance with an embodiment.

Referring now to FIG. 3, shown is a flow diagram of a method in accordance with an embodiment. As shown in FIG. 3, method 300 is a compensation method performed within a transmitter. As such, method 300 may be performed by hardware circuitry within the transmitter alone and/or further using firmware and/or software.

As illustrated, method 300 begins by receiving an RU allocation message from an access point (block 310). This RU allocation message may be sent within a given network from the access point to allocate a portion of a total bandwidth of the wireless network to the transmitter. While this allocation message may include various information, of particular interest here is position and size information.

Namely, the position information indicates which of multiple RU positions the transmitter is allocated, and the size indicates the number of tones allocated for the RU. Understand that this information may be obtained from an RU allocation message received within a given device or station that has, in addition to a transmitter, a receiver, e.g., implemented as separate circuitry or combined as a transceiver. Note that the processing of this RU allocation message may occur in higher layers such as a MAC layer, and thus some latency may occur before physical layer circuitry receives an indication of the RU allocation message.

Control next passes to block 320 where a compensation set may be selected based on the active RU position and size. In an embodiment, selection circuitry may, based on the indicated position and size, select an appropriate compensation set out of multiple such compensation sets. Note that if at the beginning of a transmission period the RU position and size information is not yet available, e.g., due to the above-described latency, at block 320 initially a default compensation set may be selected for use. Understand that during a given packet transmission, this default set may be updated to a selected compensation set when the RU position and size information becomes available.

Still referring to FIG. 3, control next passes to block 330 where an uplink packet, e.g., a TB PPDU packet, may be compensated using the selected compensation set. As discussed above in one embodiment, the compensation may be implemented by processing the incoming IQ signal using the compensation value. In one embodiment, the processing may be a complex multiplication between incoming IQ signals to be transmitted and this selected compensation set, which itself is a complex number. Such compensation may be performed in a compensation circuit, e.g., an IQ compensation circuit. Then the compensated uplink packet may be transmitted (block 340). Note that various signal processing may be performed on the compensated IQ signals to provide gain control, conversion to analog form, and so forth. In addition, the signals may be upconverted to RF levels and then amplified in a power amplifier, prior to being transmitted via an antenna. Understand while shown at this high level in the embodiment of FIG. 3, many variations and alternatives are possible.

Thus with embodiments, a transmitter may perform compensation using carefully selected compensation values appropriate for a given RU position and size when partial bandwidth transmissions occur. To obtain these carefully selected compensation sets, a calibration process may be performed. In an embodiment, this calibration process may be performed as an offline process in a lab setting. More specifically, a designer or manufacturer of an integrated circuit may perform the calibration using a manufactured IC implemented in a test environment. This IC may be controlled to transmit test signals, to enable measurement of unused tone errors in an effort to identify optimal compensation sets for different RUs. This test environment may include a device under test, namely a given integrated circuit as adapted into an evaluation board, IoT device or so forth, measurement circuitry and test control software such as a given test suite that may execute on one or more computing devices in the test environment.

Referring now to FIG. 4, shown is a flow diagram of a calibration technique in accordance with an embodiment. As shown in FIG. 4, method 400 may be performed in a test environment, and may begin by generating a test signal for a selected RU position and size (block 410). For example, test software may instruct the IC to generate a test signal for a given RU. Next at block 415, the test signal may be compensated with a candidate compensation set. Understand that this candidate compensation set may be a random value, such as one of a set of random values (each a given complex value).

As described above, the compensation may be performed via a complex multiplication between the test signal and the complex value of the candidate compensation set. After compensation, the compensated test signal is transmitted (block 420), and the transmitted signal may be measured for unused tone error, e.g., in test equipment (block 425). Note that this unused tone error may be measured for each RU within a full bandwidth, such that for the entire spectrum, unused tone errors for each RU (other than the selected RU) can be determined for this candidate compensation set. This information may be stored, e.g., in a log file for later use.

After this processing, it may be determined whether there are additional candidate compensation sets (diamond 430). If so, the process iterates back to block 410. Although embodiments are not limited in this regard, for performing a calibration process, between approximately 64 and 256 candidate compensation sets may be considered. In an embodiment, instead of linearly measuring the performance of all candidate compensation values, a gradient descent method can be used, where the process initially begins with few compensation sets with low resolution and based on the measurement data the resolution is increased further and with reduced compensation sets. Once all the candidate compensation sets for a given RU have been tested and measurement information obtained and logged, control passes to diamond 435 to determine whether there are additional RUs to test. If so, control passes again back to block 410 for further iterations for all such RUs. Then when all RUs have been tested for calibration purposes, control passes from diamond 435 to block 440.

At block 440 an optimal compensation set may be determined for each RU position and size. In an embodiment, the logged information may be analyzed to identify this optimal compensation set for each RU position and size. This optimal set may be the one that enables the smallest unused tone error in an image frequency to the selected RU. In other cases, the optimum compensation set may be a given set that provides a best range of unused tone errors across the entire spectrum.

In some cases, particularly as bandwidth of partial bandwidth systems gets larger, there may be a relatively large number of compensation sets that need to be determined. In such cases, to reduce the amount of complexity and memory required within a transmitter for storing all the compensation sets, optimizations may be performed to reduce the number of compensation sets. Accordingly, at optional block 450, the number of compensation sets may attempt to be optimized.

This optimization may be performed to attempt to reduce the number of compensation sets increase as the available bandwidth increases (e.g., 40/80 MHz). as discussed above, in one embodiment, for a 20 MHz there may be 15 compensation sets. For 40 MHz, there may be 33 compensation sets. Thus optimization may be performed to seek to reduce the number of compensation sets.

Different considerations may help determine when multiple RUs may use the same compensation set. In one implementation, optimization determination may be based on the difference in the coefficients of different compensation sets. If the compensation set values corresponding to adjacent RUs are similar (e.g., within a threshold distance or range of each other), then a single set of compensation values can be used for these RUs (note that two or more RUs may use a common compensation set). In another implementation, optimization determination may be based on image rejection ratio (IRR), unused tone error (UTE), and/or any other compliance metric. In this case, a compensation set observed for a bigger RU can be used for a smaller RU in the same space if the IRR or UTE limits are satisfied.

For example, the left or right 106 tones in 20 MHz bandwidth can accommodate two 52-tone RUs or four 26-tone RUs. The compensation set obtained for the 106-tone RU can be used for the 26/52-tone RUs in the same frequency region. Similarly, if the compensation sets for the 26-tone RUs are available, then the bigger RUs can use these also.

Finally at block 460, the compensation sets may be stored for programming into a transmitter. For example, a table may be generated having multiple entries, where each entry includes a compensation set (namely a complex value) and a corresponding RU position and size (or positions and sizes) that may use the given compensation set. Understand that this table may be stored into a given non-transitory storage medium and then programmed into integrated circuits having non-volatile memory to store the table, e.g., during factory programming. It is also possible that such table may be implemented as part of firmware for an integrated circuit that may be written into memory of the integrated circuit when it is powered up. In still other cases, compensation values may be dynamically updated in the field, e.g., via an over-the-air update of firmware and/or IC code.

During field operation, depending on when RU information is received within IQ compensation circuitry, application of a compensation set corresponding to a given RU may be performed in different ways. In some implementations, application of a compensation set may be performed in an inter-packet or static manner, while in other implementations compensation sets may be applied in an intra-packet or dynamic manner.

Figure 5:
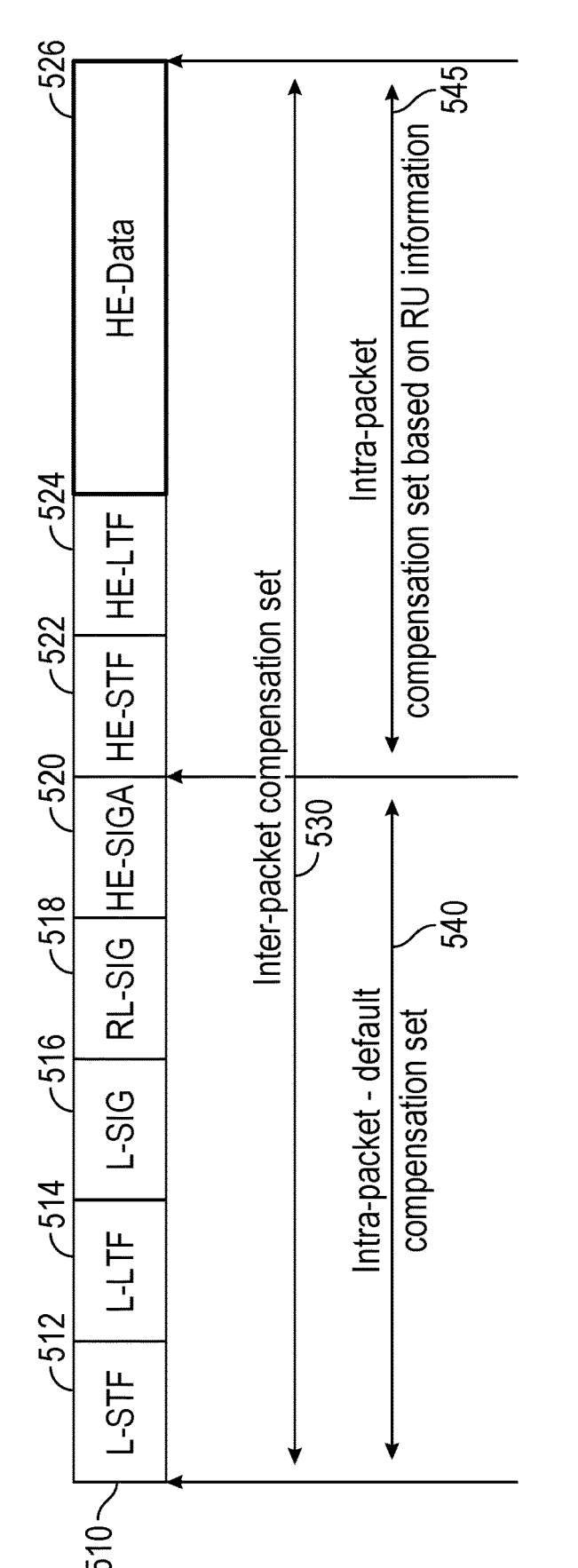
FIG. 5 is a block diagram of a packet transmission in a partial bandwidth network and compensation set application in accordance with an embodiment.

Referring now to FIG. 5, shown is a block diagram of a packet transmission in a partial bandwidth network and compensation set application. As shown in FIG. 5, a partial bandwidth network communication 500 includes an RU packet transmission 510 having preamble, signal fields, and payload information. More specifically, the preamble is formed of legacy short and long training fields 512, 514 and legacy and repeated legacy signal fields 516, 518. In addition to preamble, other training and signal fields include 520, 522, and 524. Finally, a payload portion 526 including data is present. In this embodiment the partial bandwidth transmission occurs from fields present after HE-SIGA 520.

In FIG. 5, in a first mode, namely an inter-packet mode, a single compensation set 530 is selected for an entire duration of the packet. This mode may be used when RU allocation information is known a priori, i.e., available at a start of the packet.

In a second mode, namely an intra-packet mode, different compensation sets are used for different portions of the packet. This may occur when RU information is not available to a selection circuit at a beginning of a packet, or for other reasons. In this example, a default compensation set 540 may be used for a first portion of the packet and then a compensation set 545 selected based on RU information may be used for a second portion of the packet. The point at which the compensation values are changed may be programmable. In an embodiment, the RU-based compensation set can be enabled during the HE part of the packet (unused tone error is measured on the HE data portion of the packet).

Figure 6:
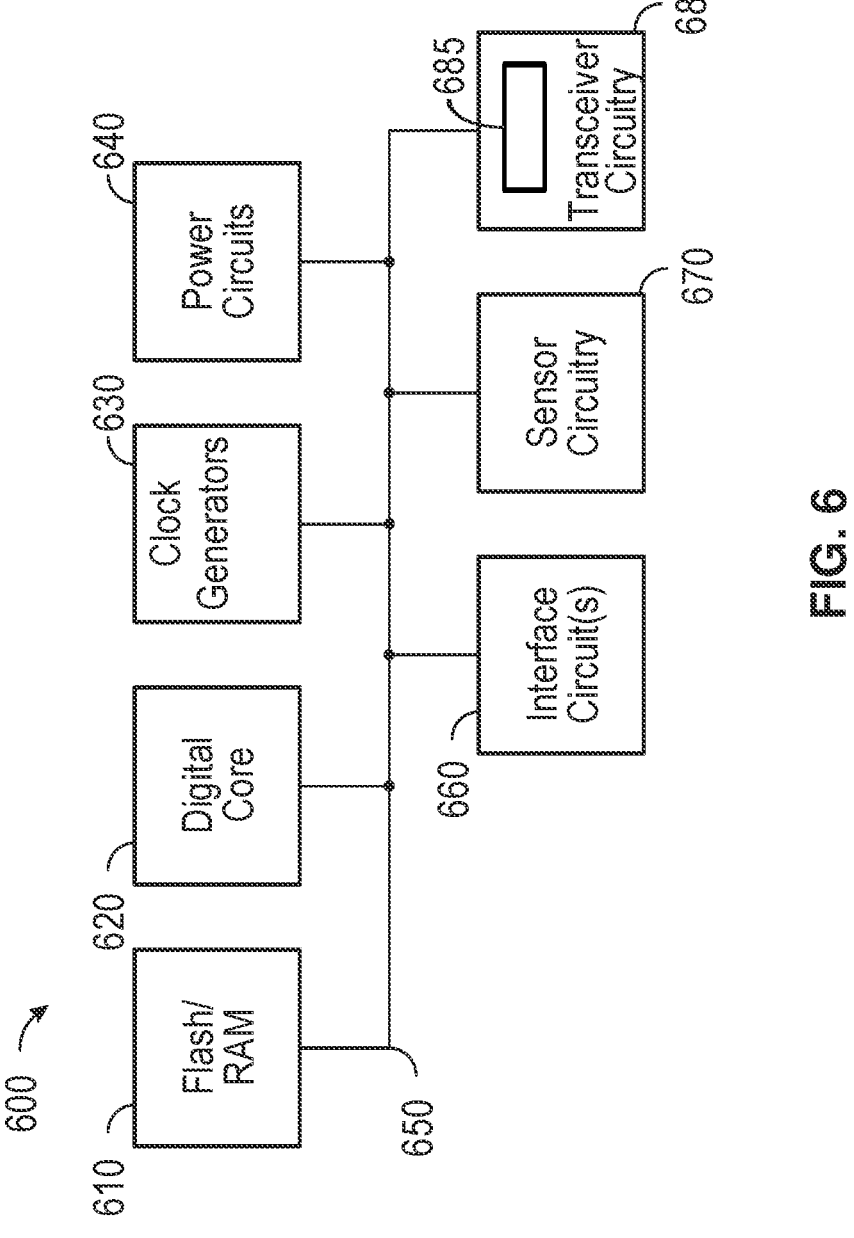
FIG. 6 is a block diagram of a representative integrated circuit that incorporates an embodiment.

Referring now to FIG. 6, shown is a block diagram of a representative integrated circuit 600 that includes compensation circuitry as described herein. In the embodiment shown in FIG. 6, integrated circuit 600 may be, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 600 includes a memory system 610 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for determining IQ mismatch and compensating for the same (and storing the multiple compensation sets), as described herein.

Memory system 610 couples via a bus 650 to a digital core 620, which may include one or more cores and/or microcontrollers that act as a main processing unit of the integrated circuit. In turn, digital core 620 may couple to clock generators 630 which may provide one or more phase locked loops or other clock generator circuitry to generate various clocks for use by circuitry of the IC.

As further illustrated, IC 600 further includes power circuitry 660, which may include one or more voltage regulators. Additional circuitry may optionally be present depending on particular implementation to provide various functionality and interaction with external devices. Such circuitry may include interface circuitry 660 which may provide interface with various off-chip devices, sensor circuitry 670 which may include various on-chip sensors including digital and analog sensors to sense desired signals, such as for a metering application or so forth.

In addition as shown in FIG. 6, transceiver circuitry 680 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 680 includes a compensation circuit 685 that can perform compensation using selected compensation sets to reduce unused tone error as described herein. Understand while shown with this high level view, many variations and alternatives are possible.

Note that ICs such as described herein may be implemented in a variety of different devices such as an IoT device. This IoT device may be, as two examples, a smart bulb of a home or industrial automation network or a smart utility meter for use in a smart utility network, e.g., a mesh network in which communication is according to an IEEE 802.15.4 specification or other such wireless protocol.

Figure 7:
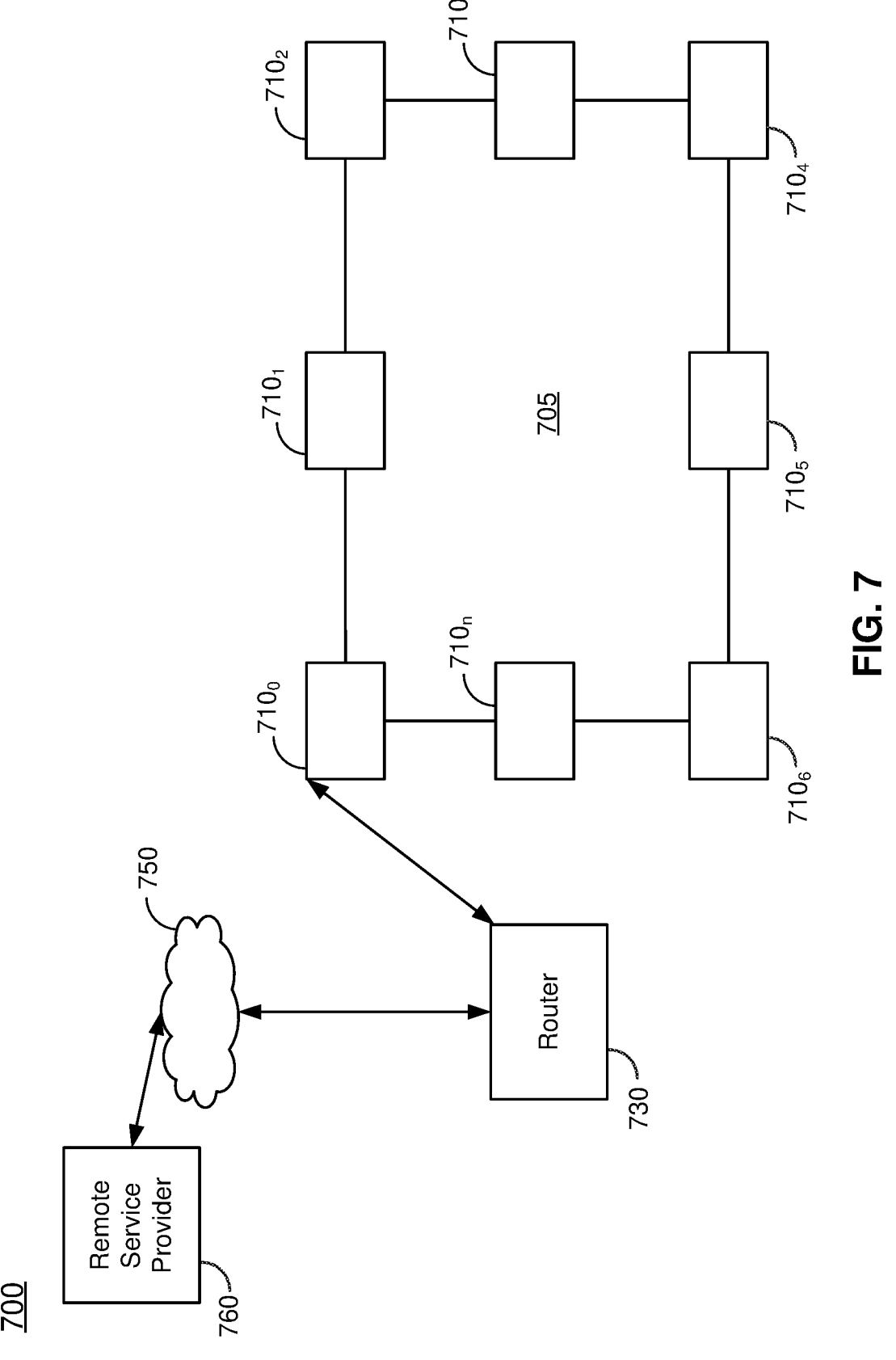
FIG. 7 is a high level diagram of a network in accordance with an embodiment.

Referring now to FIG. 7, shown is a high level diagram of a network in accordance with an embodiment. As shown in FIG. 7, a network 700 includes a variety of devices, including smart devices such as IoT devices, routers and remote service providers. In the embodiment of FIG. 7, a mesh network 705 may be present, e.g., in a building having multiple IoT devices 710₀-ₙ. Such IoT devices may perform IQ compensation using a selected compensation set, based at least in part on an allocated RU as described herein. As shown, at least one IoT device 710 couples to a router 730 that in turn communicates with a remote service provider

760 via a wide area network 750, e.g., the internet. In an embodiment, remote service provider 760 may be a backend server of a utility that handles communication with IoT devices 710. Understand while shown at this high level in the embodiment of FIG. 7, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
generating selected compensation sets iteratively, for each of a plurality of resource units (RUs) of a partial bandwidth network by:
    generating, in a device under test having an integrated circuit comprising a transmitter, a test signal for one of the plurality of RUs of the partial bandwidth network;
    iteratively, for each of a plurality of candidate compensation sets:
        compensating, in the device under test, the test signal with a candidate compensation set to generate a compensated test signal;
        transmitting, from the device under test, the compensated test signal;
        measuring and logging unused tone error information associated with the compensated test signal for other RUs of the partial bandwidth network;
        selecting from one of the candidate compensation sets a selected compensation set responsive to the selected compensation set enabling a smallest unused tone error in an image frequency of the one of the plurality of RUs compared to other compensation sets of the candidate compensation sets;
generating a reduced number of the selected compensation sets to reduce storage requirements in the integrated circuit by determining compensation sets of the selected compensation sets that can be used by multiple RUs including selecting a compensation set to be used for both a first RU and a second RU where the first RU is bigger than the second RU and the second RU is within the first RU; and
storing the reduced number of the selected compensation sets into a storage in the integrated circuit.

2. The method as recited in claim 1 further comprising determining one or more of the reduced number of the selected compensation sets that can be used by multiple RUs responsive to a compensation set for a first RU satisfying an image rejection ratio and/or unused tone error limits for a second RU.

3. The method as recited in claim 1 further comprising determining one or more of the reduced number of the selected compensation sets that can be used by multiple RUs responsive to a first selected compensation set for a first RU being within a threshold difference of a second selected compensation set for a second RU that is adjacent to the first RU.

4. The method as recited in claim 1 wherein the candidate compensation sets are random values.

5. The method as recited in claim 1 further comprising compensating the test signal by performing a complex multiplication between the test signal and the candidate compensation set.

6. The method as recited in claim 1 further comprising using a gradient descent approach to measure performance of the candidate compensation sets.

7. The method as recited in claim 1 wherein there are between approximately 64 and 256 candidate compensation sets.

\* \* \* \* \*